Patented Oct. 13, 1953

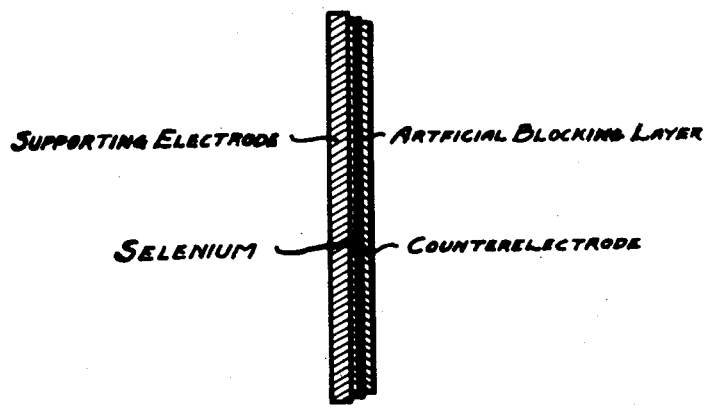

2,655,626

UNITED STATES PATENT OFFICE 2,655,626

SELENIUM RECTIFIER

Rudolph J. Cepon, North Chicago, Ill., assignor to Fansteel Metallurgical Corporation, North Chicago, Ill., a corporation of New York Application July 11, 1949, Serial No. 104,123

19 Claims. (Cl. 317—241)

This invention relates to blocking layer devices such as selenium rectifiers and light sensitive devices, and more specifically to means for forming an artificial blocking layer on the selenium.

In the production of blocking layer devices having a semiconductor layer, for example, selenium rectifiers, a rigid carrier electrode or supporting electrode is provided with a thin coating or layer of selenium. The supporting electrode may be formed of nickel, nickel-plated iron, aluminum, magnesium, beryllium or other metals and alloys. A common practice in the production of selenium rectifiers includes grit blasting the iron disc or plate and electroplating the disc with nickel. The purpose of the grit blasting is to present a roughened surface to the selenium and to thereby improve the adherence of the selenium to the carrier electrode. The disc is then thoroughly cleaned and a thin film of selenium is applied over the nickel layer.

The selenium film or layer may be formed by a variety of methods. The plate or disc may be heated to a temperature above the melting point of selenium, for example, to a temperature of from about 230° C. to 250° C., and the selenium in stick form may be rubbed across the heated plate in order to melt the selenium and form the desired film. Another method of application includes placing a measured quantity of powdered selenium or selenium in pellet form on the heated plate and flowing the melted selenium over the surface. The melted selenium is usually spread over the heated plate by mechanical means, as with a glass rod. The selenium may also be deposited on the carrier electrode from a vapor phase. The vaporization method is commonly employed in depositing the selenium film upon the light metal carrier electrodes. Various materials may be added to the selenium to increase its conductivity and otherwise impart desired characteristics and properties.

The selenium is then transformed into its gray, crystalline state by heat treatment. The coated discs are generally stacked with mica, aluminum or other inert, smooth-surfaced discs or washers in contact with the selenium and between adjacent plates, and the stack subjected to a moderate pressure. The stacks under pressure are then heated to a relatively low temperature, that is, to a temperature below 150° C., and maintained at such temperatures for from one hour to four or five hours. During this stage of the heat treatment the selenium softens so that the pressure produces a layer of selenium of relatively uniform thickness and having a smooth surface.

The stacks are withdrawn from the oven or heat treating furnace and the plates are removed from the stack. The plates are then given a further heat treatment at a temperature approaching the melting point of selenium. This heat treatment is generally conducted at temperatures between about 200° C. and the melting point of selenium, for example, about 210° C., for a period of from fifteen minutes to several hours. During the combined heat treatment, a layer of selenium is produced having a smooth surface of more or less uniform thickness and the selenium is transformed from its amorphous, non-conducting form into its gray, crystalline, conducting form.

The smooth surface of the selenium film may then be treated to form an artificial blocking layer and a counterelectrode consisting of a relatively low melting point alloy is applied, as by spraying, over the selenium coating.

The final step in the manufacture of the rectifier plates consists of an electrical forming treatment. This treatment consists of subjecting the plate to either an alternating or direct current until a high resistance is developed in the reverse direction. This step may consist of applying to the plate in the reverse direction a direct current voltage below about 15 volts or a pulsating direct current voltage starting with a low voltage of about 8 volts and gradually increasing the voltage to about 21 volts over a period of several hours. In the use of an alternating current, it is necessary to include in the circuit a current limiting resistor because one-half cycle flows in the forward direction of the rectifier plate. The voltage may be about 20 volts and the period required for forming is generally greater than that required when a direct current is employed because only one-half cycle of the current flows in the reverse direction.

Light sensitive devices of the blocking layer class are produced in a similar manner. A supporting electrode is provided with a thin film or layer of selenium in its gray, crystalline modification and an artificial blocking layer formed on the surface of the selenium. A second electrode is then applied over the treated surface of the selenium. This electrode may consist of a light-permeable film of metal or a metal grid. The application of the light-permeable metal may be accomplished by any of the methods known to the art.

This invention is directed to a method of forming an artificial blocking layer on the film of selenium in the manufacture of blocking layer devices. This method is not limited to any specific form, type of composition of carrier electrode or counterelectrode. Any method may be employed in providing the carrier electrode with the film or layer of gray, crystalline, conducting selenium. The selenium layer may or may not contain added materials to impart desired characteristics and properties.

The principal object of this invention is to provide a method of forming an artificial blocking layer on the surface of the selenium.

A further object of this invention is to provide a selenium rectifier element having a substantially higher breakdown voltage than selenium rectifiers made by the conventional methods.

Other objects and advantages of this invention will become apparent from the following description and claims.

The present invention is based upon my discovery that treatment of the selenium surface with a solution of a soluble salt of permanganic acid provides an improved blocking layer, and the breakdown voltage of elements subjected to such treatment is substantially increased.

The specific details employed in the manufacture of the elements are dependent upon the type of unit being made and the class of service for which it is designed. For purposes of illustration, the production of selenium rectifier plates is described.

A carrier electrode consisting of a grit blasted, nickel-plated, iron disc is provided with a layer of selenium in its gray, crystalline form by any of the aforementioned methods. The selenium may contain added materials to improve the conductivity as is well known in the art. The selenium surface is then treated with a solution of the permanganate, for example ammonium permanganate, potassium permanganate, sodium permanganate, zinc permanganate and the like. The solution may consist of an acetone solution containing from about 0.1 gram to about 2 grams of the permanganate, such as potassium or zinc permanganate, per 100 cc. of acetone, or the solution may consist of an aqueous solution containing from about 0.001 gram to about 1 gram of the permanganate per 100 cc. of water. The coated electrodes are preferably immersed in or passed through the solution, being allowed to remain in the solution from about 10 seconds to about 40 seconds. Upon removal of the plates they are washed in warm or hot water, dried, preferably in an atmosphere of nitrogen and the counterelectrode then applied. The rectifier plate is finally subjected to any of the desired electrical forming operations.

Selenium rectifiers treated with the permanganate solution may be operated at applied alternating current voltages between about 30 volts and 35 volts without danger of breakdown.

In the practice of my invention, for example, as applied to the manufacture of selenium rectifiers, a carrier electrode is provided with a thin film or layer of selenium in its gray, crystalline modification. The coated electrode may be formed by any of the methods well known to the art. The selenium surface is then subjected to the action of or wetted with a solution of the permanganate and the counterelectrode applied after the treated plate has been dried. The final step is the electrical forming process which is also well known in the art.

I have found that more uniform results may be obtained by first dipping the selenium coated carrier electrode in acetone and then in an aqueous solution of the permanganate.

Methods commonly employed in grading and in evaluating the quality of selenium rectifier plates include a measurement of the current passed by the plate in the reverse or blocking direction upon application of a direct current voltage to the plate in the blocking direction. An ideal or theoretically perfect rectifier plate would have no leakage current flow under such conditions. Other methods include a measurement of the voltage drop across the rectifier when a known current is flowing through the rectifier in the forward direction and in the reverse direction.

In order to compare the characteristics of rectifiers made in accordance with the present invention and of rectifier plates made in a conventional manner, a group of nickel-plated iron discs was provided with a layer of selenium in its gray, crystalline form. These coated discs were prepared by heating the discs to a temperature of about 240° C. and selenium in stick form rubbed across the plate. The selenium was spread over the surface of the heated discs by means of a glass rod. The plates were then stacked with mica discs covering the selenium layer and the stack placed under pressure and heated to a temperature below 150° C. for about 2 hours. The pressure was then removed and the plates heated to about 210° C. and maintained at this temperature for about 1 hour.

The group of plates was then divided into two series. The first series of plates was provided with a counterelectrode of the conventional type. The individual plates of the second series were immersed in an aqueous solution of potassium permanganate containing approximately 0.01 gram of potassium permanganate per 100 cc. of water and held in the solution for about 10 seconds. The plates upon removal were washed in hot water then in cool distilled water, dried in an atmosphere of nitrogen and provided with a counterelectrode. The discs or plates having no artificial blocking layer treatment and serving as control or standard plates were subjected to an electrical forming treatment by the application of a rectified alternating current voltage to each plate in the reverse or blocking direction, the rectified voltage reaching a maximum of about 21 volts. It is not possible to apply a voltage much in excess of 21 volts because the counterelectrodes melt and destroy the rectifier upon the application of voltages between about 23 volts and 25 volts.

The discs of the second series of plates were subjected to an electrical forming treatment by the application of a rectified alternating current voltage to each plate in the reverse or blocking direction, the rectified voltage reaching a maximum of about 32 volts. The treatment of the selenium surface with the solution of potassium permanganate permits the higher forming voltage to be applied without danger of injuring or destroying the rectifier. The active rectifying area of the individual plates was 0.49 sq. in.

Various electrical characteristics of the rectifier plates were then measured. A direct current voltage of 14 volts was applied to each of the plates in the reverse or blocking direction and the leakage current flow was measured. In the case of the plates made in accordance with this invention, the leakage current was also measured at an applied direct current voltage of 24 volts. The voltage drop across each of the plates was measured by passing a direct current of 13 ma. through the plate in the reverse direction. The voltage drop across each of the plates was also measured when a direct current of 75 ma. was passed through the plates in the forward direction. The results of these measurements are set forth in the following table:

TABLE I

Control plates

| Plate No. | −14 V. D. C. leakage, ma. | −13 ma. voltage drop V. | 75 ma. voltage drop V. |
|---|---|---|---|
| A | 5 | 15 | 0.88 |
| B | 8 | 15 | .82 |
| C | 4 | 16 | .88 |
| D | 5 | 14 | .92 |
| E | 5 | 15 | .82 |
| Average | 5.4 | 15 | .87 |

Treated plates

| Plate No. | −14 V. D. C. leakage, ma. | −24 V. D. C. leakage, ma. | −13 ma. voltage drop, V. | 75 ma. voltage drop, V. |
|---|---|---|---|---|
| 1 | 2 | 3 | 24 | 1.00 |
| 2 | 2 | 3 | 24 | 1.03 |
| 3 | 3 | 3 | 25 | 1.07 |
| 4 | 2 | 3 | 28 | 1.08 |
| Average | 2.3 | 3 | 25 | 1.05 |

The foregoing data illustrate the substantial improvement obtained by treating the selenium surface with a potassium permanganate solution. It is quite apparent that the leakage characteristics of plates made in accordance with this invention are substantially lower than the leakage characteristics of rectifier plates made in accordance with conventional practice. Although it is common that the leakage current increases quite rapidly with an increase in the applied voltage, the leakage of the treated plates at an applied direct current voltage of 24 volts remains appreciably lower than the leakage at 14 volts in the case of plates made in accordance with conventional practice.

The voltage drop across the individual plate when a direct current of 13 ma. flows through the plate in the reverse or blocking direction is a relative measure of the blocking layer characteristics. The voltage drop across the plate upon the passage of this fixed current in the reverse or blocking direction is not the actual permissible operating voltage, but is a comparative or relative measure of the voltage at which the particular plate may be operated continuously. For example, the control plates may be operated continuously at an applied alternating current voltage of 18 volts while the treated plates may be operated continuously at an applied alternating current voltage of 30 volts. In general, the permissible operating applied alternating current (R. M. S.) voltage can be from about 20% to about 25% higher than the measured voltage drop when a direct current of 13 ma. is passed through the rectifier plate in the reverse direction, the plate having a rectifying area of approximately 0.49 sq. in. The data indicate that an appreciable improvement in the blocking layer characteristics results from the practice of this invention.

The voltage drop across the plate upon the passage of a fixed current in the forward direction is a relative measure of the power loss of the rectifier plate if the leakage current is assumed to be the same. The voltage drop is measured by passing a pulsating direct current of 75 ma. through the plate in the forward direction, the plate having a rectifying area of 0.49 sq. in. Although this voltage drop was greater in the case of the rectifier plates made in accordance with this invention, this voltage drop in itself does not indicate a higher power loss. This may be illustrated by reference to a half-wave rectifier assembly to be operated continuously at an applied alternating current voltage of 90 volts. For such a rectifier assembly, it is necessary to employ five rectifier plates made in accordance with conventional methods. Assuming that the rectifier assembly is operating under conditions wherein 75 ma. flows through the assembly in the forward direction, a voltage drop of 4.3 volts would occur. For the same applied voltage, three rectifier plates made in accordance with my invention are sufficient for the 90 volts supply. Again assuming that the conditions are such that 75 ma. flow through the assembly in the forward direction, a voltage drop of 3.15 volts occurs across the assembly. This difference in voltage drop between a conventional assembly and an assembly including rectifier plates made in accordance with this invention represents an appreciably lower operating loss.

Another group of nickel-plated iron discs was provided with a film of selenium in its gray, crystalline form. The selenium was applied to the discs from a vapor phase. This group of plates was divided into two series. The first series of plates was provided with counterelectrodes in the conventional manner without subjecting the selenium surface to an artificial blocking layer treatment. The second series of plates was immersed in acetone, withdrawn and immediately immersed in and held, for about 10 seconds, in an aqueous solution of potassium permanganate containing approximately 0.05 grams of potassium permanganate per 100 cc. of water. These plates were then washed with water and dried in an atmosphere of nitrogen. The counterelectrode was subsequently applied. Both series of plates were subjected to an electrical forming treatment by the application of a rectified, alternating current voltage to the individual plates in the reverse or blocking direction, the voltage reaching a maximum of about 21 volts. The rectifying area of the individual plates was 0.99 sq. in.

A direct current voltage of 14 volts was applied to each of the plates in the reverse or blocking direction and the leakage current measured. The voltage drop across each plate was measured by passing a direct current of 28 ma. through each plate in the reverse direction. A direct current of 0.3 amperes was passed through each plate in the forward direction and the voltage drop across each plate was measured.

The results of these measurements are set forth in the following table:

TABLE II

Control plates

| Plate No. | −14 V. D. C. leakage, ma. | −28 ma. voltage drop, V. | 0.3 amp. voltage drop, V. |
|---|---|---|---|
| F | 2.5 | 18.0 | 0.73 |
| G | 4.0 | 18.0 | .72 |
| H | 7.2 | 18.0 | .71 |
| I | 2.0 | 18.0 | .72 |
| J | 8.0 | 16.5 | .74 |
| K | 8.0 | 16.5 | .76 |
| L | 12.0 | 17.0 | .74 |
| Average | 6.2 | 17.4 | .73 |

Treated plates

| Plate No. | −14 V. D. C. leakage, ma. | −28 ma. voltage drop, V. | 0.3 amp. voltage drop, V. |
|---|---|---|---|
| 5 | 1.0 | 21.0 | 1.00 |
| 6 | 2.0 | 20.0 | .94 |
| 7 | 1.3 | 21.0 | 1.01 |
| 8 | 1.3 | 20.5 | .99 |
| 9 | .3 | 21.0 | 1.05 |
| 10 | 1.2 | 20.0 | 1.04 |
| 11 | 2.0 | 20.0 | 1.05 |
| 12 | 4.0 | 20.0 | 1.04 |
| 13 | 1.2 | 20.0 | 1.02 |
| 14 | 1.0 | 21.0 | 1.06 |
| Average | 1.5 | 20.5 | 1.02 |

The improvement in the leakage characteristics is quite apparent from the data. The voltage drop across the individual plate when a direct current of 28 ma. flows through a plate of this area in the reverse or blocking direction is a relative measure of the blocking layer characteristics. It is interesting to note that although both the control plates and the treated plates were electrically formed to 21 volts the voltage drop across the treated plates was only slightly lower than the maximum forming volts. In general, this voltage drop is always appreciably lower than the maximum voltage employed in electrically forming, as illustrated by the voltage drop in the control plates. The results of these measurements indicate that the treated plates could be operated continuously at an applied alternating current voltage of at least 21 volts. The voltage drop across the plates upon the passage of a pulsating direct current of 0.3 amp. in the forward direction indicates a higher loss in the case of the treated plates. This test of the treated plates, however, is not complete because these plates have not been completely formed to the maximum forming voltage.

The series of plates in which the selenium surface had been treated with the potassium permanganate solution were subsequently subjected to a further electrical forming treatment by the application of a rectified alternating current voltage to each plate in the reverse or blocking direction, the rectified voltage reaching a maximum of 34 volts. The leakage current was then measured by applying a direct current voltage of 24 volts to each of the plates in the reverse or blocking direction. A direct current of 28 ma. was passed through each of the plates in the reverse or blocking direction and the voltage drop across the plates was measured. In the apparatus employed in these tests the maximum voltage range of the meter scale was 30 volts and it was not possible to measure the exact voltage drop. In each plate the voltage drop was over 30 volts and estimated to be between 32 volts and 34 volts. A pulsating direct current voltage was then applied to each of the plates in the forward direction, the current flow adjusted to 0.3 ampere and the voltage drop across the plate measured. The current flow was then adjusted so that 0.15 ampere flowed through the plate in the forward direction and the voltage drop across each plate was measured. These measurements were as follows:

TABLE III

Treated plates

| Plate No. | −24 V. D. C. leakage, ma. | 0.3 amp. voltage drop, V. | 0.15 amp. voltage drop, V. |
|---|---|---|---|
| 5 | 1.5 | 1.12 | 0.80 |
| 6 | 2.5 | 1.00 | .81 |
| 7 | 1.0 | 1.05 | .84 |
| 8 | 2.2 | 1.04 | .83 |
| 9 | 1.0 | 1.06 | .88 |
| 10 | 1.6 | 1.10 | .86 |
| 11 | 1.4 | 1.10 | .87 |
| 12 | 5.0 | 1.10 | .88 |
| 13 | 2.4 | 1.10 | .86 |
| 14 | 1.6 | 1.10 | .86 |
| Average | 2.0 | 1.08 | .86 |

The leakage of the plates as finally formed is appreciably lower at an applied direct current voltage of 24 volts than the leakage current of the control plates at an applied direct current voltage of 14 volts. The voltage drop across these plates when a direct current of 28 ma. passed through each of the plates in the reverse or blocking direction was only slightly below the maximum voltage reached during the electrical forming. This is unusual since plates made in the conventional manner generally exhibit a voltage drop appreciably less than the maximum voltage reached during forming. These plates may be continuously operated at an applied alternating current voltage of at least 30 volts.

The voltage drop across the plates upon the passage of a pulsating direct current of 0.3 amp. in the forward direction indicates a somewhat higher loss in the case of the treated plates as compared to the control plates. This apparent higher loss, however, is not an indication that a higher loss will result in the use of the treated plates as compared to the control plates. For a rectifier assembly designed for continuous operation at an applied alternating current voltage of 90 volts, five control plates are necessary, while three of the plates made in accordance with this invention may be substituted for such five plates. Assuming that the conditions are such that 0.3 amp. flows through the assemblies, a voltage drop of 3.65 volts occurs in the assembly of control plates whereas a voltage drop of 3.24 volts results in the use of the plates made in accordance with the present invention.

A comparison of the data in Table I and the data in Table III indicates that a somewhat superior blocking layer is formed by first immersing the plates in acetone before immersing the plates in the potassium permanganate solution. A visual inspection of the selenium surfaces of plates subjected to these two types of treatments indicates a more uniform action of the permanganate solution on the selenium surface which is first wet with acetone. So far as I have been able to determine acetone itself does not alter the characteristics of the rectifiers.

A third group of nickel-plated iron discs was provided with a layer of selenium in its gray, crystalline form. The selenium layer was applied to the plates and the selenium transformed into its gray, crystalline form in the same manner as that described for the first group of plates.

The group of plates was then divided into two series, the first series being provided with a counterelectrode in the conventional manner.

The individual discs of the second series were immersed in an acetone solution of potassium permanganate containing approximately 0.1 gram of potassium permanganate per 100 cc. of acetone and held in the solution for about 10 seconds. The plates upon removal from this solution were rinsed in acetone and subsequently given a second rinse in acetone. The plates were dried in nitrogen and were provided with the usual counterelectrode.

The plates of both series were simultaneously subjected to an electrical forming treatment by the application of a rectified alternating current voltage to each plate in the reverse or blocking direction, the rectified voltage reaching a maximum of about 21 volts. The rectifying area of this group of plates was 1.85 sq. in.

Each plate was then subjected to various electrical tests similar to those described hereinbefore. The leakage current was measured at an applied direct current voltage of 14 volts. The voltage drop was measured when a direct current of 50 ma. flows through the plate in the reverse or blocking direction. The voltage drop across the plate was also measured when a pulsating direct current of 0.6 amp. was passed through the rectifier plate in the forward direction. The specific fixed current employed in these tests are based upon a rectifying area of 1.85 sq. in. The results of these tests are set forth in the following table:

TABLE IV

*Control plates*

| Plate No. | −14 V. D. C. leakage, ma. | −50 ma. voltage drop, V. | 0.6 amp. voltage drop, V. |
|---|---|---|---|
| M | 14 | 16.0 | 0.81 |
| N | 11 | 16.0 | .76 |
| O | 12 | 15.5 | .89 |
| P | 8 | 16.0 | .85 |
| Q | 7 | 16.5 | .84 |
| R | 9 | 14.5 | .82 |
| S | 8 | 16.0 | .83 |
| Average | 9.9 | 15.8 | .83 |

*Treated plates*

| Plate No. | −14 V. D. C. leakage, ma. | −50 ma. voltage drop, V. | 0.6 amp. voltage drop, V. |
|---|---|---|---|
| 15 | 6.0 | 21.0 | 0.82 |
| 16 | 2.5 | 21.0 | .75 |
| 17 | 4.2 | 22.0 | .76 |
| 18 | 3.0 | 22.5 | .79 |
| 19 | 6.0 | 22.0 | .76 |
| 20 | 1.8 | 22.0 | .89 |
| Average | 3.9 | 21.8 | .80 |

The leakage characteristics of the treated plates exhibit an improvement similar to the improvement obtained in the two previous examples. The voltage drop upon the passage of the direct current of 50 ma. through the plates in the reverse direction is of the order of that of the second example. In case of the treated plates the voltage drop was slightly above the maximum forming voltage. The voltage drop across the plates when the pulsating direct current flows through the plates in the forward direction was slightly less in the case of the treated plates as compared to the control plates. This data illustrate a substantial improvement although the treated plates have not been fully formed electrically. If such plates were used in an installation wherein an applied alternating current of 18 volts is employed it is obvious that their characteristics are substantially improved as compared to the control plates.

The series of plates in which the selenium surface had been treated with the acetone solution of potassium permanganate were subsequently subjected to a further electrical forming treatment by the application of a rectified alternating current voltage to each plate in the reverse or blocking direction, the rectified voltage reaching a maximum of 34 volts. Similar electrical measurements were made and in addition the leakage current was measured at an applied direct current voltage of 24 volts. The measurements are set forth in the following table:

TABLE V

*Treated plates*

| Plate No. | −14 V.D.C. leakage, ma. | −24 V.D.C. leakage, ma. | −50 ma. voltage drop, V. | 0.6 amp. voltage drop, V. |
|---|---|---|---|---|
| 15 | 3.2 | 9.0 | 28 | 0.87 |
| 16 | 1.9 | 6.0 | 28 | .84 |
| 17 | 2.8 | 7.0 | 30 | .83 |
| 18 | 2.0 | 6.0 | 29 | .86 |
| 19 | 3.0 | 9.0 | 29 | .83 |
| 20 | 1.0 | 3.0 | 31 | .94 |
| Average | 2.3 | 6.7 | 29.2 | .86 |

The leakage characteristics of the plates as finally formed are substantially lower than those of the control plates at an applied voltage of 14 volts. The leakage of the plates remains appreciably lower at an applied voltage of 24 volts as compared to the leakage of the control plates at an applied voltage of 14 volts. The voltage drop across the plates when a current of 50 ma. flows through the plate in the reverse or blocking direction is higher because of the higher forming voltages employed. The plates made in accordance with this invention may be operated continuously at an applied voltage of at least 30 volts.

The voltage drop when a pulsating direct current of 0.6 amp. flows through the plates in the forward direction is only slightly greater than the voltage drop in the case of the control plates. This indicates a substantial improvement over the conventional rectifier plates. In designing rectifier assemblies for continuous operation at 90 volts, three plates made in accordance with the present invention may replace five plates made in accordance with conventional practice. If it is assumed that the conditions are such that a current of 0.6 amp. flows through the assemblies, a voltage drop of 2.58 volts will result in the assembly of plates made in accordance with this invention whereas a voltage drop of 4.15 volts will result in the assembly of conventional plates.

A comparison of the data in Table I with the data in Tables IV and V indicates that the plates made by subjecting the selenium surface to the action of the acetone solution of potassium permanganate are somewhat superior to those formed by using an aqueous solution of potassium permanganate. The selenium surfaces of plates made in this manner appear to be more uniformly wetted and acted upon than in the case of the selenium surfaces treated with the aqueous solution of potassium permanganate. Acetone itself does not alter the characteristics of the rectifiers.

Although I prefer to employ potassium permanganate because of its ready availability and inexpensiveness as compared to the other salts of permanganic acid, similar improvements in the blocking layer are obtained by the use of the other salts. The production of selenium rectifier plates by the use of permanganates may be further illustrated by references to the treatment of the selenium surface with zinc permanganate.

A group of nickel-plated aluminum discs was provided with a thin layer of selenium in its gray, crystalline form. The selenium was a commercial grade which had been doped with bromine in accordance with commercial practice. The group of plates was then divided into three series. The first series of plates, identified by Series T, was provided with a counter-electrode of the conventional type, this series serving as a control or standard. The plates of the second series, identified by Series 21, were immersed in an aqueous solution of zinc permanganate containing 0.2 gram of the salt per 100 cc. of water and held in the solution for about 10 seconds. The plates were then subjected to three rinses with water, dried in an atmosphere of nitrogen and provided with a counterelectrode. The plates of the third series, identified by Series 22, were treated in a manner similar to the second series substituting, however, a solution containing 0.2 gram of zinc permanganate per 100 cc. of acetone for the aqueous solution. The individual plates of all series were simultaneously subjected to an electrical forming operation in which the maximum forming voltage at the end of 3½ hours reached 21 volts. Higher forming voltages cannot be employed in the case of the control plates, Series T, without excessive heating which melts the counterelectrode. The rectifying area of the plates was approximately 1.85 sq. in.

Various electrical characteristics normally employed in evaluating selenium rectifier plates of this size were then measured. The leakage current flow was measured by applying a direct current voltage of 14 volts to each plate in the reverse or blocking direction. The voltage drop across each of the plates was measured by passing a direct current of 50 ma. through the plate in the reverse direction. The voltage drop was also measured when a pulsating direct current of 0.6 amp. was passed through each plate in the forward direction. The average measurements were as follows:

TABLE VI

| Series | −14 V. D. C. leakage, ma. | −50 ma. voltage drop, V. | 0.6 amp. voltage drop, V. |
| --- | --- | --- | --- |
| T | 3.6 | 17.5 | 0.80 |
| 21 | 2.4 | 18.8 | .93 |
| 22 | 2.8 | 18.2 | .84 |

This data illustrate that an appreciable decrease in the leakage characteristics is effected by the use of zinc permanganate. Although, as pointed out hereinbefore, the voltage drop across the rectifier plate is not the actual permissible voltage for continuous operation, this measurement is a comparative measure of the breakdown voltage of the blocking layer. In the case of the treated plates, they may be operated at higher applied voltages than the control plates. The fact that the treated plates exhibited a higher voltage drop when a current of 0.6 amp. was passed in the forward direction does not indicate a low quality because the plates may be operated at higher voltages, as explained hereinbefore.

The plates of Series 21 were subsequently subjected to an additional forming operation wherein the voltage reached a maximum of 27 volts. Similar measurements of the electrical characteristics were made, however, the leakage was measured at 22 volts. The average measurements were as follows:

TABLE VII

| Series | −22 V. D. C. leakage, ma. | −50 ma. voltage drop, V. | 0.6 amp. voltage drop, V. |
| --- | --- | --- | --- |
| 21 | 4.5 | 22.9 | 0.91 |

Although the leakage of selenium rectifier plates normally increases enormously with an increase in the applied voltage, the leakage characteristics of these plates at 22 volts is well within the allowable limit. The leakage characteristics of the control plates was not measured at this voltage because the plates will break down at a lower voltage. The voltage drop when a current of 50 ma. is passed in the reverse direction is a further indication of the appreciably higher voltages which may be continuously applied to the treated plates. The voltage drop as measured when a current of 0.6 amp. flows in the forward direction does not indicate that the rectifier is of poorer quality than the control plates because the treated plates may be employed at appreciably higher applied voltages.

My invention may be further illustrated by reference to the treatment of the selenium surface with sodium permanganate solutions. Three series of rectifier plates were provided as in the illustration with reference to the use of zinc permanganate. The first series, Series U, was employed as a control and the selenium surface was untreated. The second series, Series 23, was treated with an aqueous solution containing 0.2 gram sodium permanganate per 100 cc. of water and water was used in rinsing the plates after treatment. The third series, Series 24, was treated with an acetone solution containing 0.2 gram of the salt per 100 cc. of acetone and acetone was used in rinsing the plates. The plates of all series were simultaneously subjected to an electrical forming operation, the maximum voltage reaching 21 volts.

Similar electrical characteristics were measured. The leakage was measured by applying a direct current voltage of 14 volts in the reverse direction. The voltage drop was measured by passing a direct current of 50 ma. in the reverse direction. The voltage drop was measured by passing a pulsating direct current of 0.6 amp. in the forward direction. The average measurements were as follows:

TABLE VIII

| Series | −14 V.D.C. leakage, ma. | −50 ma. voltage drop, V. | 0.6 amp. voltage drop, V. |
|---|---|---|---|
| U | 3.4 | 18.0 | 0.92 |
| 23 | 2.7 | 20.4 | 1.13 |
| 24 | 1.6 | 26.0 | 1.30 |

The leakage characteristics are substantially improved as well as the permissible operating voltage. Although the voltage drop as measured when 0.6 amp. flows in the forward direction is higher than that of the control plates, this increase is more than off-set by the lower leakage and the increase in the permissible operating voltage.

The plates of Series 23 and 24 were subsequently subjected to a further electrical forming operation wherein the voltage reached a maximum of 34 volts. As pointed out, the control plates will not withstand a forming voltage in excess of about 23 volts and no attempt was therefore made to subject this series to a further forming operation. Similar measurements were made of the electrical characteristics, however, the leakage characteristics were measured at 22 volts. The average measurements were as follows:

TABLE IX

| Series | −22 V.D.C. leakage, ma. | −50 ma. voltage drop, V. | 0.6 amp. voltage drop, V. |
|---|---|---|---|
| 23 | 2.6 | 28.8 | 1.15 |
| 24 | 1.9 | 32.1 | 1.30 |

The leakage characteristics at 22 volts of these plates are superior to the leakage characteristics at 14 volts of the control plates and are of the same order as the characteristics of these plates at 14 volts upon forming to 21 volts. Normally, a small increase in the reverse voltage causes an enormous increase in leakage characteristics. The voltage drop at 50 ma. indicates that the plates may be operated at voltages of about 30 volts and indicates a substantial improvement in the blocking layer. Although the plates exhibit a higher voltage drop at 0.6 amp., the fact that the leakage characteristics and operating voltages are substantially improved more than compensates for this increase in the forward resistance. For example, if a half-wave rectifier is designed for service at an applied voltage of 90 volts, 5 Series U plates would be required as against 3 Series 23 or 24 plates. Assuming that the rectifier were operating at a current flow of 0.6 amp., the voltage drops, a measure of the power loss, would be 4.6 volts for the Series U stack, 3.45 volts for the Series 23 stack and 3.9 volts for the Series 24 stack. The rectifier plates of this illustration exhibit an appreciably lower operating loss.

Although acetone and water have been described as the solvents for the permanganate salts, other solvents may be employed. For example, methyl ethyl ketone has been employed with satisfactory results. Two series of rectifier plates were provided as in the illustration with reference to the use of zinc permanganate. The first series, Series W, was employed as a control and the selenium surface was untreated. The second series, Series 25, was treated with a solution consisting of 0.2 gram potassium permanganate per 100 cc. of methyl ethyl ketone and this solvent was used in rinsing the plates. The plates of Series W were then subjected to an electrical forming operation wherein the maximum forming voltage reached 21 volts. The plates of Series 25 were subjected to an electrical forming treatment wherein the forming voltage reached 34 volts.

The leakage characteristics of the plates was measured by applying a direct current voltage of 14 volts to the plates in the reverse direction. The voltage drop was measured by passing a direct current of 50 ma. in the reverse direction. The voltage drop was also measured by passing a pulsating direct current of 0.6 amp. in the forward direction. The average measurements were as follows:

TABLE X

| Series | −14 V.D.C. leakage, ma. | −50 ma. voltage drop, V. | 0.6 amp. voltage drop, V. |
|---|---|---|---|
| W | 3.0 | 18.6 | 0.77 |
| 25 | 2.2 | 34.2 | .83 |

The data illustrate a substantial improvement in the electrical characteristics similar to the improvements shown by the preceding examples. These plates may be operated continuously at an applied alternating current voltage of at least 30 volts.

The drawing is a transverse sectional view of a selenium rectifier plate, the thickness being shown at an enlarged scale. The supporting electrode may be of any conventionally used metal such as nickel-plated iron, steel, aluminum, or the like. The selenium layer may be relatively pure selenium or it may contain added material to improve its conductivity. The artificial blocking layer comprises reaction products of selenium and a permanganate salt solution. The counterelectrode is a conventional low melting point alloy.

The improvements in the operating characteristics of the rectifiers made in accordance with this invention are quite apparent from the foregoing data. It is also found that an improvement results by dipping the plates in acetone before immersion in the aqueous solution and by employing acetone throughout.

Other oxidizing agents such as hydrogen peroxide, dilute solutions of hydrogen peroxide, nitric acid, oxygen and the like do not produce the results obtainable by the use of solutions of the permanganate salts. The permanganates are distinctively unique because the selenium rectifiers prepared in accordance with the present invention may be subjected to forming voltages of 34 volts to 35 volts and may be continuously operated at applied alternating current voltages of the order of 30 volts without injuring and damaging the rectifier plates due to excessive heating. Rectifier plates made by treating the selenium surface with hydrogen peroxide and dilute solutions of hydrogen peroxide, for example, will not withstand forming voltages exceeding about 23 volts to about 25 volts. Rectifier plates made by treating the selenium surface with hydrogen peroxide are destroyed by a melting of the counterelectrode upon application of forming voltages exceeding this range.

Although in the specific examples, acetone solutions or aqueous solutions of the permanganate have been employed for the treatment of the selenium surface, the solution may consist of a mixture of acetone and water. The concentrations set forth hereinbefore are the preferred concentrations, similar results may be obtained by the use of concentrations beyond the ranges set forth. For example, although the acetone solutions preferably contain from about 0.1 gram to about 2 grams of the permanganate per 100 cc. of acetone the concentration of the acetone solution may lie below this range. The amount of the permanganate may be as low as a trace. Solutions containing about 2 grams of potassium permanganate per 100 cc. of acetone are substantially saturated. Similarly, in the case of aqueous solutions, the concentration may vary from the preferred concentrations set forth hereinbefore. Higher concentration solutions although they are satisfactory require a more careful and rapid manipulation to avoid excessive action upon the selenium surface. Lower concentration solutions require a greater period of treatment.

In the methods as described, the coated plate or the selenium surface is wetted by immersion in the permanganate solution. The selenium surface may be treated with the solution in other manners, for example, by brushing or wiping the solution over the selenium surface or by spraying the solution onto the selenium surface. In these other methods of application, it is important to uniformally coat or apply to the selenium surface the permanganate solution. After the solution has had sufficient time to act upon the selenium surface it is washed off or rinsed in the same manner as that described hereinbefore.

It is apparent from the foregoing disclosure that the formation of artificial blocking layers by the treatment of the selenium surface with solutions of permanganate salts is not merely a simple oxidation of the selenium surface. The blocking layer produced in the practice of this invention apparently consists of reaction products of the selenium and permanganate. For example, the maximum forming voltages which may be employed where the selenium surface has been treated with aqueous solutions of potassium dichromate, potassium bromate, sulfuric acid, nitric acid and sodium hydroxide and acetone solutions of potassium dichromate and potassium bromate are from about 21 volts to about 24 volts. The maximum forming voltage permissible in the case of both aqueous and acetone solutions of hydrogen peroxide and chromic acid is about 27 volts.

This application is a continuation in part of my copending application, Serial No. 659,859, filed April 5, 1946, and entitled Selenium Rectifiers. For so much of the subject matter herein disclosed, which is also disclosed in my said copending application, I claim priority of said application.

I claim:

1. The method of producing selenium rectifier plates which comprises providing a supporting electrode with a layer of gray, crystalline selenium, wetting the surface of the selenium layer with a solution of a permanganate salt, permitting the solution of the permanganate salt to react with the selenium surface and applying a counterelectrode over the treated surface.

2. The method of producing selenium rectifier plates which comprises providing a supporting electrode with a layer of gray, crystalline selenium, wetting the surface of the selenium layer with an aqueous solution of a permanganate salt, permitting the solution of the permanganate salt to react with the selenium surface and applying a counterelectrode over the treated surface.

3. The method of producing selenium rectifier plates which comprises providing a supporting electrode with a layer of gray, crystalline selenium, wetting the surface of the selenium layer with an acetone solution of a permanganate salt, permitting the solution of the permanganate salt to react with the selenium surface and applying a counterelectrode over the treated surface.

4. The method of producing selenium rectifier plates which comprises providing a supporting electrode with a layer of gray, crystalline selenium, wetting the surface of the selenium layer with a solution of potassium permanganate, permitting the solution of potassium permanganate to react with the selenium surface and applying a counterelectrode over the treated selenium surface.

5. The method of producing selenium rectifier plates which comprises providing a supporting electrode with a layer of gray, crystalline selenium, wetting the surface of the selenium layer with a solution of sodium permanganate permitting the solution of sodium permanganate to react with the selenium surface and applying a counterelectrode over the treated surface.

6. The method of producing selenium rectifier plates which comprises providing a supporting electrode with a layer of gray, crystalline selenium, wetting the surface of the selenium layer with a solution of zinc permanganate, permitting the solution of zinc permanganate to react with the selenium surface and applying a counterelectrode over the treated surface.

7. The method of producing selenium rectifier plates which comprises providing a supporting electrode with a layer of gray, crystalline selenium, wetting the surface of the layer with a solution of potassium permanganate, permitting the solution of potassium permanganate to react with the selenium surface for from about 10 seconds to about 40 seconds and applying a counterelectrode over the treated selenium surface.

8. The method of producing selenium rectifier plates which comprises applying a layer of selenium to a supporting electrode, transforming the selenium into its gray, crystalline form, wetting the surface of the selenium layer with a solution of potassium permanganate, permitting the solution of potassium permanganate to react with the selenium surface for from about 10 seconds to about 40 seconds, washing the treated plate, applying a counterelectrode over the treated selenium surface and subjecting the element to an electrical forming operation.

9. The method of producing selenium rectifier plates which comprises applying a layer of selenium to a supporting electrode, transforming the selenium into its gray, crystalline form, wetting the surface of the selenium layer with a dilute aqueous solution of potassium permanganate, permitting the solution of potassium permanganate to react with the selenium surface and applying a counterelectrode over the treated selenium surface.

10. The method of producing selenium rectifier plates which comprises applying a layer of selenium to a supporting electrode, transforming the selenium into its gray, crystalline form, washing the coated plate with acetone, wetting the surface of the selenium layer with a dilute aqueous solution of potassium permanganate, permitting the solution of potassium permanganate to react with the selenium surface and applying a counterelectrode over the treated selenium surface.

11. The method of producing selenium rectifier plates which comprises applying a layer of selenium to a supporting electrode, transforming the selenium into its gray, crystalline form, wetting the surface of the selenium layer with an acetone solution of potassium permanganate, permitting the solution of potassium permanganate to react with the selenium surface and applying a counterelectrode over the treated selenium surface.

12. A selenium rectifier plate comprising a supporting electrode, a layer of selenium on the electrode and a counterelectrode over the selenium, the surface of the selenium adjacent the counterelectrode having thereon reaction products resulting from a reaction between the surface of the selenium and a solution of a permanganate salt.

13. A selenium rectifier plate comprising a supporting electrode, a layer of gray, crystalline selenium on the electrode and a counterelectrode over the selenium, the surface of the selenium adjacent the counterelectrode having thereon reaction products resulting from a reaction between the surface of the selenium and a solution of potassium permanganate.

14. A selenium rectifier plate comprising a supporting electrode, a layer of gray, crystalline selenium on the electrode and a counterelectrode over the selenium, the surface of the selenium adjacent the counterelectrode having thereon reaction products resulting from a reaction between the surface of the selenium and a solution of sodium permanganate.

15. A selenium rectifier plate comprising a supporting electrode, a layer of gray, crystalline selenium on the electrode and a counterelectrode over the selenium, the surface of the selenium adjacent the counterelectrode having thereon reaction products resulting from a reaction between the surface of the selenium and a solution of zinc permanganate.

16. The method of producing blocking layer devices which comprises providing a supporting electrode with a layer of gray, crystalline selenium, wetting the surface of the selenium layer with a solution of a permanganate salt, permitting the solution of the permanganate salt to react with the selenium surface and applying a counterelectrode over the treated surface.

17. A blocking layer device comprising a supporting electrode, a layer of selenium on the electrode and a counterelectrode over the selenium, the surface of the selenium adjacent the counterelectrode having thereon reaction products resulting from a reaction between the surface of the selenium and a solution of a permanganate salt.

18. The method of producing blocking layer devices which comprises providing a supporting electrode with a layer of gray, crystalline selenium, wetting the surface of the selenium layer with a solution of a material consisting essentially of a permanganate salt, permitting the solution of the permanganate salt to react with the selenium surface and applying a counterelectrode over the treated surface.

19. The method of producing blocking layer devices which comprises providing a supporting electrode with a layer of gray, crystalline selenium, washing the coated electrode with acetone, wetting the surface of the selenium layer with a solution of a material consisting essentially of a permanganate salt, permitting the solution of the permanganate salt to react with the selenium surface and applying a counterelectrode over the treated surface.

RUDOLPH J. CEPON.

References Cited in the file of this patent

UNITED STATES PATENTS

| Number | Name | Date |
|---|---|---|
| 2,429,655 | Von Hippel et al. | Oct. 28, 1947 |
| 2,481,739 | Goodman | Sept. 13, 1949 |